United States Patent
Nabetani et al.

(10) Patent No.: US 10,523,407 B2
(45) Date of Patent: Dec. 31, 2019

(54) WIRELESS COMMUNICATION DEVICE AND WIRELESS COMMUNICATION METHOD

(71) Applicant: KABUSHIKI KAISHA TOSHIBA, Minato-ku, Tokyo (JP)

(72) Inventors: Toshihisa Nabetani, Kanagawa (JP); Masahiro Sekiya, Tokyo (JP); Narendar Madhavan, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 35 days.

(21) Appl. No.: 15/909,532

(22) Filed: Mar. 1, 2018

(65) Prior Publication Data

US 2019/0089519 A1    Mar. 21, 2019

(30) Foreign Application Priority Data

Sep. 15, 2017   (JP) .................................. 2017-178250

(51) Int. Cl.
    *H04L 5/14* (2006.01)
    *H04L 5/00* (2006.01)
    *H04W 72/04* (2009.01)
    *H04W 72/12* (2009.01)

(52) U.S. Cl.
    CPC .......... *H04L 5/1469* (2013.01); *H04L 5/0053* (2013.01); *H04W 72/0446* (2013.01); *H04W 72/1205* (2013.01); *H04W 72/042* (2013.01)

(58) Field of Classification Search
    CPC ....... H04L 5/1469; H04L 1/16; H04L 5/0053; H04W 72/0446; H04W 72/1205; H04W 84/12; H04W 72/042
    See application file for complete search history.

(56) References Cited

U.S. PATENT DOCUMENTS

| | | | |
|---|---|---|---|
| 8,675,633 B2 | 3/2014 | Nabetani et al. | |
| 9,031,054 B2* | 5/2015 | Marin | H04W 74/006 370/348 |
| 9,198,196 B2 | 11/2015 | Nabetani et al. | |
| 9,565,644 B2 | 2/2017 | Nabetani et al. | |
| 9,826,492 B2 | 11/2017 | Nabetani et al. | |
| 10,080,240 B2* | 9/2018 | Choi | H04W 74/0816 |
| 2008/0095123 A1* | 4/2008 | Kuroda | H04B 3/542 370/336 |
| 2017/0359827 A1* | 12/2017 | Kim | H04W 72/048 |

OTHER PUBLICATIONS

S. Kim, and W. Stark: "On the Performance of Full Duplex Wireless Networks," in Proc. 47th CISS, 2013.
Y. Sugiyama, et al.: "A Wireless Full-duplex and Multi-hop Network with Collision Avoidance using Directional Antennas," in Proc. 7th International Conference on Mobile Computing and Ubiquitous Networking, pp. 38-43, 2014.

* cited by examiner

*Primary Examiner* — Walter J Divito
(74) *Attorney, Agent, or Firm* — Foley & Lardner LLP

(57) ABSTRACT

According to one embodiment, a wireless communication device includes a receiver and a transmitter. The receiver receives a first frame in a predetermined frequency band. The transmitter transmits a second frame in the predetermined frequency band at a same time as receipt of the first frame. The transmitter transmits control information that controls a transmission timing of a third frame that is a response frame to the second frame. The transmitter transmits a fourth frame that is a response frame to the first frame, at a timing according to the control information.

22 Claims, 12 Drawing Sheets

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2017-178250, filed on Sep. 15, 2017, the entire contents of which are incorporated herein by reference.

FIELD

Embodiments of the present invention relate to a wireless communication device and a wireless communication method.

BACKGROUND

A full duplex communication technique has been discussed as a technique of improving system throughput in an environment where many terminals reside. In full duplex communication, a single terminal simultaneously performs transmission and reception in a predetermined frequency band. The full duplex communication can improve the use efficiency of the time resource in comparison with the conventional half duplex communication. More specifically, an improvement to achieve twice throughput is expected at the maximum.

During full duplex communication, a possible difference in time length between the uplink traffic and downlink traffic causes some problems. For example, during continuation of downlink transmission by one terminal, possible completion of uplink transmission by the other terminal causes a duration only with downlink transmission. The one terminal is required to transmit acknowledgement response (ACK response) SIFS-after completion of uplink transmission by the other terminal, but cannot transmit an ACK response because the downlink transmission continues. To address this, a method of causing the uplink traffic and the downlink traffic to have the same transmission time length and a method of delaying ACK transmission have been proposed. Unfortunately, the length of the ACK frame is not necessarily constant. Accordingly, there is a possibility that timings at which reception of the ACK frame is completed by terminals deviate from each other. Consequently, there is a possibility that a hidden terminal problem or an exposed terminal problem occurs and the start timing of transmitting the next frame cannot be synchronized. Such a problem may degrade the system throughput.

DETAILED DESCRIPTION

Figure 1:
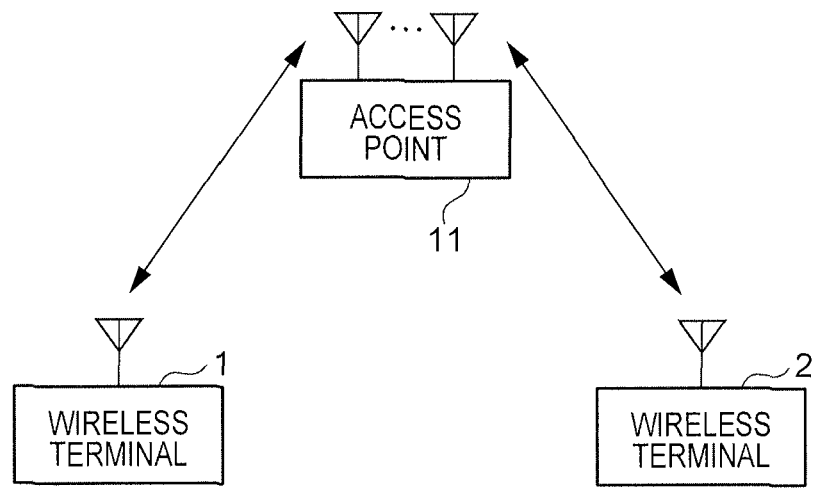
FIG. 1 is a diagram showing an example of a wireless communication system according to a first embodiment.

According to one embodiment, a wireless communication device includes a receiver and a transmitter. The receiver receives a first frame in a predetermined frequency band. The transmitter transmits a second frame in the predetermined frequency band at a same time as receipt of the first frame. The transmitter transmits control information that controls a transmission timing of a third frame that is a response frame to the second frame. The transmitter transmits a fourth frame that is a response frame to the first frame, at a timing according to the control information.

IEEE Std 802.11™-2012 and IEEE Std 802.11ac™-2013, which are known as wireless LAN standards, are hereby incorporated by reference in their entirety.

Hereinafter, referring to the drawings, embodiments of the present invention will be described. In the diagrams, the same configuration elements are assigned the same numerals. The description thereof is appropriately omitted.

First Embodiment

FIG. 1 shows a wireless communication system according to this embodiment. The wireless communication system is a wireless LAN (Local Area Network) that includes access point (AP) 11 serving as a base station, and multiple wireless terminals (hereinafter referred to as terminals) 1 and 2.

Access point 11 is a mode of a terminal, but is different from terminals 1 and 2 in that access point 11 has a relay function. Access point 11 and terminals 1 and 2 communicate according to IEEE 802.11 standard. Alternatively, a configuration of communication according to another communication scheme may be adopted. Access point 11 includes one or more antennas. FIG. 1 shows only two (terminals 1 and 2) wireless terminals. However, a greater number of terminals may reside.

Access point 11 is mounted with a wireless communication device that transmits and receives MAC frames (hereinafter simply described as frames in some cases) via the antenna. The wireless communication device includes: a wireless communicator that wirelessly transmits and receives a signal; and a controller or a communication control device that controls communication by transmitting and receiving a frame via the wireless communicator.

Access point 11 forms a wireless communication group that is a Basic Service Set (BSS) in IEEE 802.11 standard, for example. Access point 11 establishes wireless links to terminals 1 and 2 by preliminarily performing a process which is referred to as an association process. A state where the wireless link is established is represented as connection to access point 11.

Access point 11 communicates with terminal 1 and terminal 2 via the wireless communicator. Note that access point 11 is only required to communicate with terminal 1 and terminal 2, and is not necessarily required to have a function as an access point defined in IEEE 802.11 standard. In this case, access point 11 can be regarded as a relay station that relays communication between terminals 1 and 2.

Terminals 1 and 2 each include one or more antennas. Terminals 1 and 2 each include a wireless communication device that transmits and receives a frame via the antenna. The wireless communication device includes: a wireless communicator that wirelessly transmits and receives a signal; and a controller or a communication control device that controls communication by transmitting and receiving a frame via the wireless communicator.

Any one of terminals 1 and 2 may have an access point function. In this case, the terminal having the access point function may communicate with access point 11 via the relay station. Instead of the herein-described configuration, another network configuration may be adopted as long as the configuration allows access point 11 to relay frames between multiple terminals.

Access point 11 may be connected further to a network other than the wireless network to which terminals 1 and 2 belong. The other network may be a wired network, a wireless network, or a hybrid network thereof.

In this embodiment, the MAC frame (frame) is transmitted and received as communication. More specifically, a physical packet that includes the frame and a physical header (PHY header) added to this frame is transmitted and received. In the following description, in a case where a representation that a frame is transmitted or received is used, a physical packet including the frame is transmitted or received in actuality. In a case where a representation of the length of a frame or a frame length is used in the following description, this representation may indicate the length of a physical packet that contains this frame, or the packet length.

Figure 2A:
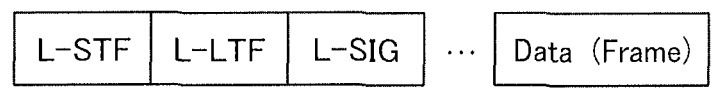
FIGS. 2A and 2B each is a diagram showing a configuration example of a physical packet.

FIG. 2A illustrates a schematic configuration example of a physical packet. The physical packet includes a physical header and a frame added to the end of the physical header. As an example, the physical header includes L-STF (Legacy-Short Training Field), L-LTF (Legacy-Long Training Field) and L-SIG (Legacy Signal Field) defined in accordance with the IEEE 802.11 standard.

L-STF, L-LTF, and L-SIG are fields that can be recognized by terminals of legacy standards such as IEEE 802.11 b/a/n/ac and the like, and pieces of information such as information for signal detection, information for frequency correction (or reception power measurement or propagation path estimation), transmission rate (MCS (Modulation and Coding Scheme)), and the like are stored therein. L-STF and L-LTF constitute a legacy preamble part. Fields other than those mentioned herein may be included.

Figure 2B:
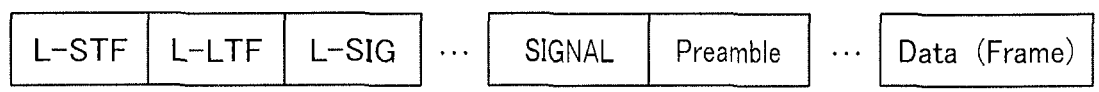

FIG. 2B shows a configuration example of a physical packet. "SIGNAL" field, and "Preamble" field which is other than the legacy preamble, are arranged after "L-SIG" field. Information for notification to the terminal is set in "SIGNAL" field in conformity with the standard used therefor. The information to be notified to the terminal may contain, for example, information on MCS applied to the frame for the payload. Information for channel estimation, reception power measurement, or frequency correction may be set in this other "Preamble" field.

Figure 3A:
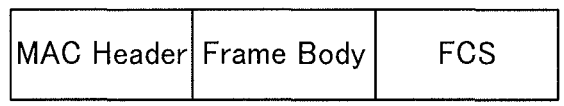
FIGS. 3A and 3B are diagrams showing a format example of a MAC frame.
Figure 3B:
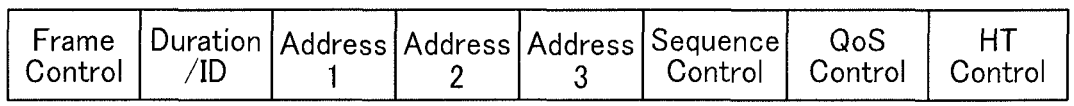

FIG. 3A illustrates an example of a basic format of a MAC frame. This frame format includes fields of MAC header, frame body, and FCS. As illustrated in FIG. 3B, the MAC header includes fields of Frame Control, Duration/ID, Address 1, Address 2, Address 3, Sequence Control, QoS Control, and HT (High Throughput) control.

All of these fields need not necessarily be provided and some of these fields may not be provided. For example, the Address 3 field may not be provided. In addition, there may be cases in which either or both of QoS Control and HT Control fields do not exist. There may be cases where the frame body field does not exist. On the other hand, other fields not illustrated in FIG. 3B may also be provided. For example, an Address 4 field may be additionally provided. The HT Control field may be expanded to other fields depending on the standard in use such as VHT (Very High Throughput) or HE (High Efficiency) Control field.

A receiver address (RA) is entered in the field of Address 1, a transmitter address (TA) is entered in the field of Address 2, and a BSSID (Basic Service Set IDentifier) which is an identifier of a basic service set (BSS) (which may be a wildcard BSSID covering all BSSIDs with all the bits set to 1) or a TA is entered in the field of Address 3 depending upon the purpose of the frame.

The Frame Control field includes two fields of Type and Subtype. Rough discrimination of the frame type of whether it is a data frame, a management frame, or a control frame is performed based on the Type field, and more specific discrimination of the roughly discriminated frames is performed based on the Subtype field.

The Duration/ID field describes a medium reservation time, and it is determined that the medium is virtually busy from the end of the physical packet including the MAC frame to the medium reservation time when a MAC frame addressed to another terminal has been received. The Sequence Control field stores the sequence number of the frame and the like. The QoS field is used to perform QoS control such that transmission is performed taking into consideration the priority of the frames. The HT Control field is a field introduced by IEEE 802.11n.

FCS (Frame Check Sequence) information is set in the FCS field as a checksum code used in frame error detection at the receiving side. As an example of the FCS information, CRC (Cyclic Redundancy Code) may be mentioned.

Here, access point 11 can execute full duplex communication, and can receive a frame from terminal 1 (or terminal 2) and transmit a frame to terminal 2 (terminal 1) at the same time using a predetermined frequency band (predetermined channel). To allow access point 11 to achieve full duplex communication, terminals 1 and 2 have a function in conformity therewith.

Access point 11 may perform full duplex communication with any one of the terminals, or full duplex communication with the two terminals. In the case of full duplex communication with the two terminals, access point 11 may receive a frame from terminal 1 and transmit a frame to terminal 2 at the same time, or may receive a frame from terminal 2 and transmit a frame to terminal 1 at the same time.

Hereinafter, description is made assuming that access point 11 performs full duplex communication with any one of the terminals (here terminal 1). That is, the description is made assuming that access point 11 transmits a frame and receives a frame to and from terminal 1 at the same time. However, also in the case where access point 11 performs full duplex communication with the two terminals, only the destinations and sources are changed but the basic processes are analogous.

To support full duplex communication, access point 11 has a function of canceling self-interference. Here, the self-interference is interference that is caused by a signal transmitted toward terminal 1 and affects a reception signal from terminal 1. If the transmission signal is leaked or reflected to the receiver in the same device, the leakage or reflection serves as an interference signal to affect the reception signal, and the signal reception becomes difficult in some cases.

The function of canceling self-interference may be achieved by any of the antenna, hardware, and software. The function may be performed by analog signal processing, digital signal processing, or a combination thereof.

It is assumed that terminal 1, which performs full duplex communication with access point 11, also has the function of canceling self-interference. In the case where access point 11 performs full duplex communication with two terminals 1 and 2 but terminals 1 and 2 do not perform full duplex communication with each other (i.e., terminals 1 and 2 perform half duplex communication), terminals 1 and 2 may be so-called legacy terminals (e.g., terminals in conformity with IEEE 802.11b/a/n/ac, etc.), which do not have the function of canceling the self-interference signal.

Figure 4:
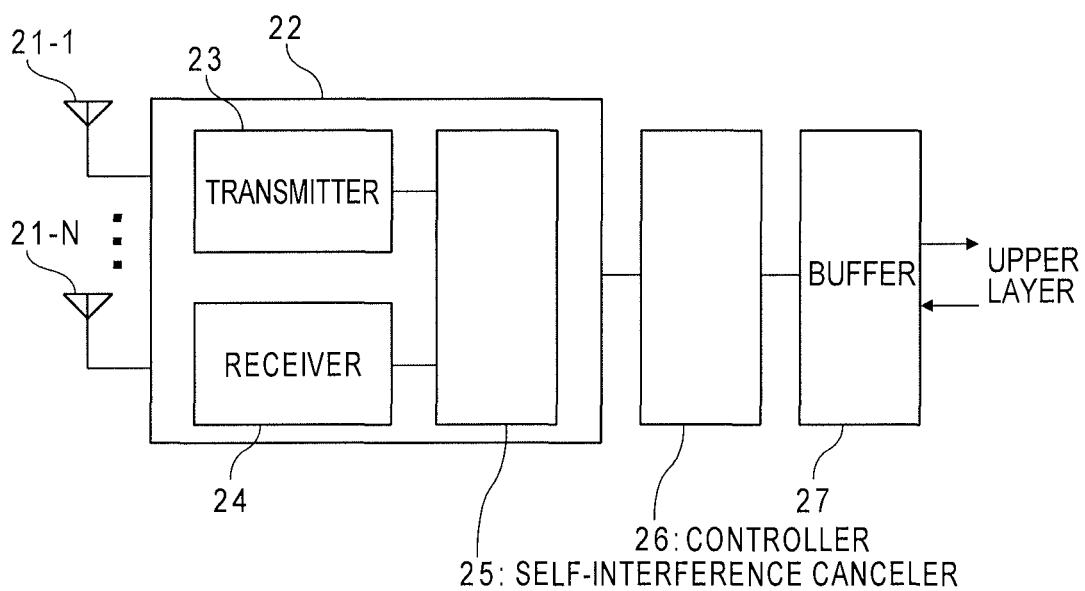
FIG. 4 is a block diagram showing a configuration example of a wireless communication device mounted on an access point according to the first embodiment.

FIG. 4 shows a functional block diagram of the wireless communication device at access point 11 according to this embodiment.

The wireless communication device in access point 11 includes at least one antenna 21-1 to 21-N (N is an integer of one or more), wireless communicator 22, controller 26, and buffer 27. Wireless communicator 22 includes transmitter 23, receiver 24, and self-interference canceler 25. In the case of multiple antennas, these antennas may be separated as an antenna for transmission and an antenna for reception, or may be commonly used for transmission and reception. In the case where the antenna is commonly used, the connection destination of the antenna may be switched with a switch.

The process in each block may be performed by software (program) operating in a processor, such as CPU, or hardware or performed by both of software and hardware. The process in each block may be performed by an analog process, a digital process, or both the analog process and the digital process.

Controller 26 mainly performs a part of the process on the MAC layer and the process on the physical layer. Controller 26 performs a process required to control communication with the terminal. For example, control required for full duplex communication and processes accompanying this control according to this embodiment described later, are performed. Furthermore, the processes include switching between full duplex communication and half duplex communication, selection of the communication destination terminal, setting of the rate of transmission to the communication destination terminal, and setting of the start timing of transmitting ACK frame and the timing of completion of receiving ACK frame.

Controller 26 manages the MAC layer and PHY layer, and stores information required for the management in a buffer in controller 26 or outside thereof. Information pertaining to the terminals managed by access point 11, and information pertaining to access point 11 itself may be managed by the buffer. The buffer may be a device, such as a memory, an SSD, or a hard disk. In the case of the memory, this memory may be a volatile memory, such as DRAM, or a nonvolatile memory, such as NAND or MRAM. The buffer may be the same storage medium as buffer 27 described later, or another storage medium.

In a case where controller 26 holds data for transmission, controller 26 generates a frame that contains the data. Controller 26 then obtains a transmission right in conformity with the communication scheme to be used, and transmits the frame via transmitter 23. The transmission right corresponds to an access right to the wireless medium.

For example, a carrier is sensed on the basis of CSMA/CA (Carrier Sense Multiple Access with Collision Avoidance). When the wireless medium is idle, the transmission right is obtained. At this time, a frame (more specifically, a physical packet that includes the frame and a physical header added to this frame) is transmitted to transmitter 23 in TXOP (Transmission Opportunity) based on the transmission right. TXOP corresponds to a time period during which the wireless medium can be occupied.

A part of or the entire physical header may be added by transmitter 23. Controller 26 may output, to transmitter 23, a signal that indicates at least one of the transmission rate (MCS) applied to the frame, and the transmission power.

Even in a case where controller 26 does not hold data to be transmitted, controller 26 may generate a control frame or a management frame that does not include data, obtain the transmission right in conformity with the communication scheme to be used, and transmit the frame via transmitter 23.

Transmitter 23 encodes and modulates, and DA (Digital to Analog) converts the packet passed from controller 26. Transmitter 23 extracts a signal component in a desired band from the analog signal, and causes an amplifier to amplify the extracted signal. Transmitter 23 then transmits the amplified signal via antennas 21-1 to 21-N.

When MCS is designated by controller 26, transmitter 23 encodes and modulates the packet on the basis of MCS. When the transmission power is designated by controller 26, transmitter adjusts the output of the amplifier so as to achieve transmission with this transmission power. When the MCS to be applied to the frame is set in the physical header of the packet, transmitter 23 may encode and modulate the frame on the basis of the MCS designated in the physical header.

Receiver 24 causes a Low Noise Amplifier (LNA) to amplify the signal received through the antenna. Furthermore, frequency conversion (down-conversion) is applied, and the component pertaining to a desired frequency band is extracted through a filtering process. The extracted signal is converted by AD-conversion. The digital signal is demodulated and decoded. In decoding, error detection and error correction may also be performed. Lastly, a physical header process is performed, and the frame is input into controller 26. A part of or the entire physical header process may be performed by controller 26.

Self-interference canceler 25 cancels self-interference due to leakage and reflection of the transmission signal during full duplex communication. During full duplex communication, signals are simultaneously transmitted and received. Accordingly, the transmission signal is leaked to the antenna for reception, and the signal is input into receiver 24 in a state of being mixed with the reception signal, in some cases. To address this, self-interference canceler 25 removes the component of the transmission signal input into receiver 24.

The self-interference can be removed through, for example, a circuit that establishes an isolation between transmitter 23 and receiver 24. Alternatively, the transmission signal output from transmitter 23 may be input into receiver 24 or an upstream circuit, and the transmission signal may be subtracted from the mixed signal. The self-interference may be removed from the mixed signal by another method.

Buffer 27 is used as a storage area for exchanging data between an upper layer and controller 26. Buffer 27 may temporarily store data contained in the frame received from the terminal in order to relay the data to another terminal. Upon receipt of the frame destined for access point 11, the data may be temporarily stored in buffer 27 in order to pass the data in the frame to the upper layer.

The upper layer performs a process pertaining to a communication protocol, such as TCP/IP or UDP/IP, which is upper than the MAC layer controlled by controller 26. The upper layer may perform a process for the application layer besides the process for TCP/IP or UDP/IP. The operation of the upper layer may be performed through the process of software (program) operating in a processor, such as CPU, through hardware, or through both software and hardware.

Figure 5:
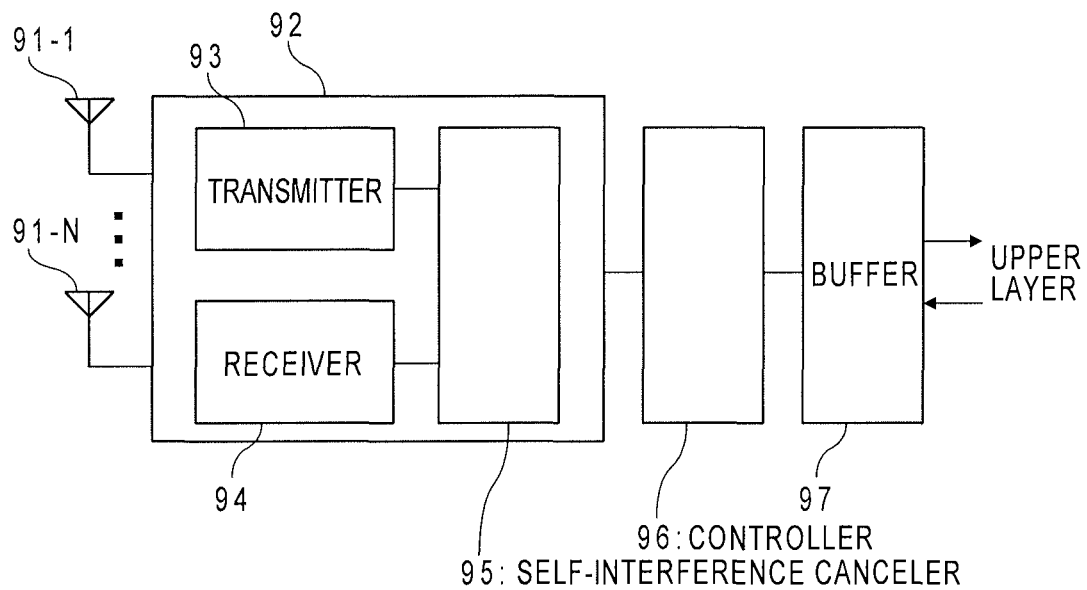
FIG. 5 is a block diagram showing a configuration example of a wireless communication device mounted on a terminal according to the first embodiment.

FIG. 5 shows a functional block diagram of a wireless communication device in terminal 1 according to this embodiment. Terminal 2 has the same configuration as terminal 1 does.

The wireless communication device in terminal 1 includes at least one antenna 91-1 to 91-N (N is an integer of one or more), wireless communicator 92, self-interference canceler 95, controller 96, and buffer 97. Wireless communicator 92 includes transmitter 93, and receiver 94. In the case of multiple antennas, these antennas may be separated as an antenna for transmission and an antenna for reception, or may be commonly used for transmission and reception. In the case where the antenna is commonly used, the connection destination of the antenna may be switched with a switch.

The process in each block may be performed by software (program) operating in a processor, such as CPU, or hardware or performed by both of software and hardware. The process in each block may be performed by an analog process, a digital process, or both the analog process and the digital process.

Controller 96 mainly performs a part of the process on the MAC layer and the process on the physical layer. Controller 96 performs control that supports full duplex communication performed by access point 11, and processes accompanying this control.

Controller 96 manages the MAC layer and the PHY layer, and stores information required for management in a buffer in controller 96 or outside thereof. Information pertaining to access point 11, and information pertaining to this terminal itself may be managed through the buffer. The buffer may be a device, such as a memory, an SSD, or a hard disk. In the case of the memory, this memory may be a volatile memory, such as DRAM, or a nonvolatile memory, such as NAND or MRAM. This buffer may be the same storage medium as buffer 97, or another storage medium.

In a case where data or information to be transmitted is stored, controller 96 generates a frame that contains the data or information, obtains a transmission right according to a communication scheme to be used, and transmits the frame through transmitter 93. The transmission right corresponds to an access right to the wireless medium. For example, a carrier is sensed on the basis of CSMA/CA (Carrier Sense Multiple Access with Collision Avoidance). If the transmission right is obtained with the wireless medium being idle, a frame (more specifically, a physical packet that includes the frame and a physical header added to this frame) is transmitted to transmitter 93 in TXOP (Transmission Opportunity) based on the transmission right. TXOP corresponds to a time period during which the wireless medium can be occupied. A part of or the entire physical header may be added by transmitter 93. Controller 96 may output, to transmitter 93, a signal that indicates at least one of the transmission rate (MCS) applied to the frame, and the transmission power.

Even in a case where controller 96 does not hold data to be transmitted, controller 96 may generate a control frame or a management frame that does not include data, obtain the transmission right in conformity with the communication scheme to be used, and transmit the frame via transmitter 93.

Transmitter 93 encodes, modulates and DA (Digital to Analog) converts the packet passed from controller 96, extracts the signal component in a desired band from the analog signal, and causes an amplifier to amplify the extracted signal. Transmitter 93 then transmits the amplified signal via antennas 91-1 to 91-N. When MCS is designated by controller 96, transmitter 93 encodes and modulates the packet on the basis of MCS. When the transmission power is designated by controller 96, transmitter 93 adjusts the operation of the amplifier so as to achieve transmission with this transmission power. When the MCS to be applied to the frame is set in the physical header of the packet, transmitter 93 may encode and modulate the frame on the basis of the MCS set in the physical header.

Receiver 94 causes a Low Noise Amplifier (LNA) to amplify the signal received via antenna, frequency-converts (down-converts) the signal, and applies a filtering process thereto to extract a desired band component. Receiver 94 AD-converts the extracted signal into a digital signal, demodulates and error-correction-decodes, and applies a physical header process to the digital signal, and inputs the frame to controller 96. A part of or the entire physical header process may be performed by controller 96.

Upon receipt of the frame that requires an acknowledgement response, controller 96 generates an acknowledgement response frame (an ACK frame, a BA (Block Ack) frame, etc.) on the basis of an inspection result of the received frame, and transmits the generated acknowledgement response frame via transmitter 93.

Buffer 97 is used as a storage area for exchanging data between an upper layer and controller 96. Upon receipt of the frame destined for this terminal, buffer 97 may temporarily store the data in the frame in order to pass this data to the upper layer. The upper layer performs a process pertaining to a communication protocol, such as TCP/IP or UDP/IP, which is upper than the MAC layer controlled by controller 96. The upper layer may perform a process for the application layer besides the process for TCP/IP or UDP/IP. The operation of the upper layer may be performed through the process of software (program) operating in a processor, such as CPU, through hardware, or through both software and hardware.

Self-interference canceler 95 cancels self-interference due to leakage and reflection of the transmission signal during full duplex communication. The operation of self-interference canceler 95 is analogous to that of self-interference canceler 25 of access point 11. Accordingly, the detailed description thereof is omitted.

Figure 6:
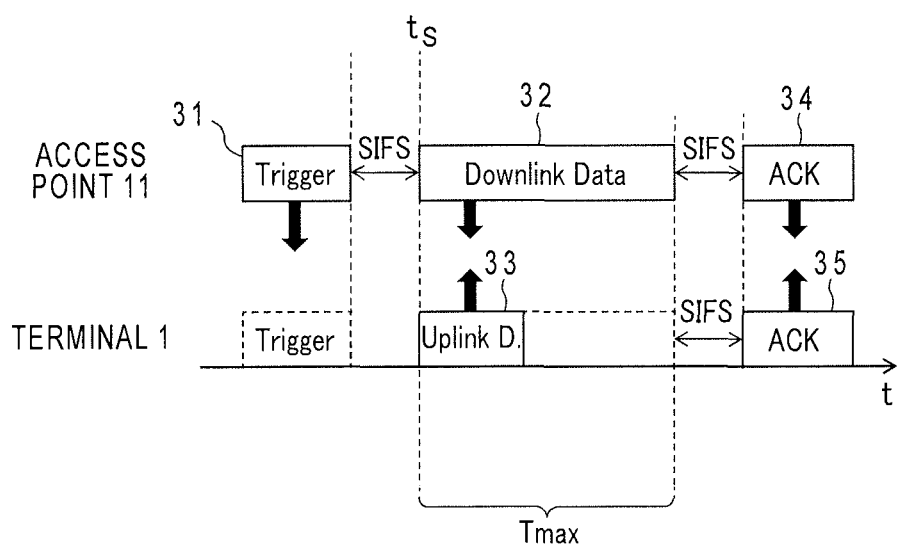
FIG. 6 is a diagram showing an example of a frame sequence according to the first embodiment.

Next, referring to FIG. 6, an operation example pertaining to full duplex communication in this embodiment is described. This embodiment has one characteristic that full duplex communication of data frames between access point 11 and terminal 1 is performed, and subsequently the timing of transmission of ACK frame, which is a response frame to the data frame, is controlled and the time length of ACK frame is controlled to thereby align the timings of starting transmission and completing reception of ACK frame with each other. FIG. 6 is a diagram showing an example of a frame sequence according to this embodiment.

Access point 11 obtains the transmission right according to CSMA/CA, and transmits Trigger frame 31. The destination of Trigger frame 31 may be the unicast address of terminal 1, which is the opposite party of full duplex communication, or a broadcast address. In the case of the broadcast address, terminal 1 may be notified that terminal 1 is a target to be permitted to perform uplink transmission or a target of full duplex communication, by setting the identification information on terminal 1 in Trigger frame 31. The identification information on terminal 1 may be the AID, MAC address, or another value. Information indicating that a downlink data frame is to be transmitted to terminal 1 in full duplex communication, may be set in Trigger frame 31.

Access point 11 sets, in Trigger frame 31, control information that controls the timing of transmitting ACK frame. Information specifying maximum transmission time length "Tmax" permitted in uplink transmission is set as an example of the control information. The time length may be directly designated in units of microseconds, or designated using another unit, such as the number of OFDM symbols. The units described above are only examples. Another unit may be used as long as the unit can uniquely specify the length of time period. In a case where the maximum transmission time length has been predefined in the system or specifications or has already been notified by another method, the notification about the maximum transmission time length may be omitted. Information other than that described here (e.g., the MCS or data size used in uplink transmission) may be set in Trigger frame 31. "Tmax" set in Trigger frame 31 may have a different value every time Trigger frame 31 is transmitted. For example, a method of appropriate determination according to the time length of data frame 32 scheduled to be subsequently transmitted is considered.

Trigger frame 31 may be a frame obtained by extending the trigger frame defined in IEEE 802.11ax, or another frame defined for full duplex communication.

After lapse of a certain duration from transmission of Trigger frame 31, access point 11 starts downlink transmission of data frame 32 to the terminal. The certain time period is, for example, SIFS (Short Inter Frame Space). SIFS is 16 μsec in the current wireless LAN standards. Note that the certain time period may be a duration different from SIFS. The time length of data frame 32 is maximum transmission time length "Tmax" or a time length shorter than "Tmax". Here, it is assumed that the time length of data frame 32 coincides with maximum transmission time length "Tmax". Hereinafter, data frame 32 downlink-transmitted from the access point to terminal 1 is sometimes referred to as downlink data frame 32.

Terminal 1 receives Trigger frame 31, and detects that uplink transmission is permitted. Terminal 1 generates data frame 33 for uplink transmission having a length equal to or less than maximum transmission time length "Tmax". Here, a case is assumed where data frame 33 shorter than maximum transmission time length "Tmax" is generated. The certain duration (here SIFS) after completion of receiving Trigger frame 31, terminal 1 starts uplink transmission to data frame 33. Accordingly, at the same time when terminal 1 uplink-transmits data frame 33, terminal 1 starts reception of data frame 32 from access point 11. In the example in FIG. 6, it is assumed that the time point of starting transmission of data frame 33 or data frame 32 is "$t_s$". Hereinafter, the data frame uplink-transmitted from the terminal to the access point is sometimes referred to as uplink data frame 33.

According to the above processes, full duplex communication between access point 11 and terminal 1 is started. Downlink data frame 32 and uplink data frame 33 may be, for example, a frame, such as an A-MPDU (aggregation MAC protocol data unit) frame or an A-MSDU (aggregation MAC service data unit) frame, in which multiple subframes are aggregated.

In a case where the time length of the data frame generated by terminal 1 is shorter than maximum transmission time length "Tmax", padding having a length of shortage to the longest time length may be added to the end of the data frame. The type of the bit string used for padding is not necessarily specified. This example assumes a case where the time length of the data frame to be transmitted by terminal 1 is shorter than maximum transmission time length "Tmax", and no padding data is added to the end of the data frame.

At the same time as transmitting downlink data frame 32, access point 11 receives data frame 33. As uplink data frame 33 is shorter, reception of uplink data frame 33 is completed in the middle of transmission of downlink data frame 32. On the other hand, at the same time as transmitting uplink data frame 33, terminal 1 receives downlink data frame 32. Even after completion of transmitting uplink data frame 33, terminal 1 receives downlink data frame 32.

At a time point SIFS-after completion of transmission of data frame 32, access point 11 starts transmission of ACK frame 34 in response to data frame 33. That is, access point 11 starts transmission of ACK frame 34 at a time point (maximum transmission time length "Tmax"+"SIFS")-after start time point "$t_s$" of transmitting downlink data frame 32.

At a time point SIFS-after completion of reception of downlink data frame 32, terminal 1 starts transmission of ACK frame 35 in response to downlink data frame 32. That is, terminal 1 starts transmission of ACK frame 35 at a time point (maximum transmission time length "Tmax"+"SIFS")-after start time point "$t_s$" of transmitting uplink data frame 33.

According to the above operations, the start time point of transmitting ACK frame 34 by access point 11 coincides with the start time point of transmitting ACK frame 35 by terminal 1. That is, the timings (ACK timings) of acknowledgement responses (ACK responses) of access point 11 and terminal 1 coincide with each other.

At a time point SIFS-after completion of receiving downlink data frame 32 (at a time point (maximum transmission time length "Tmax"+"SIFS")-after start time point "$t_s$" of transmitting uplink data frame 33), terminal 1 stands by for receiving ACK frame 34 from access point 11. Terminal 1 receives ACK frame 34 transmitted from access point 11. Without reception of ACK frame for a certain time period (="α") from this time point (the time point may indicate any of a case without starting reception and a case without completion of reception), retransmission time-out is determined. In the case of retransmission time-out, it is recognized that the transmitted data frame fails in transmission, and the data frame is required to be retransmitted.

More specifically, terminal 1 determines the time-out time period (the time period until the retransmission time-out) for uplink data frame 33 on the basis of maximum transmission time length "Tmax" of uplink data frame 33 notified through Trigger frame 31. More specifically, the retransmission time-out is determined at time point "$t_s$"+"Tmax"+"SIFS"+"α". That is, the retransmission time-out is determined at the time point after lapse of "SIFS"+"α" from completion of receiving downlink data frame 32. Here, the slot time (nine microseconds) is typically used as "α". Another value may be adopted instead. When the retransmission time-out is determined, terminal 1 is only required to retransmit uplink data frame 33. According to a related art, terminal 1 determines the retransmission time-out at the time point (a time period "SIFS"+"α")-after completion of transmitting uplink data frame 33. According to this embodiment, the retransmission time-out is determined at the time point after lapse of a time period "SIFS"+"α" from full duplex communication start time point "$t_s$"+maximum transmission time length "Tmax". That is, there is a difference from the related art in the time point of retransmission time-out and in that the retransmission time-out time period can be controlled through Trigger frame 31.

The retransmission time-out of terminal 1 has herein been described in detail. The description is also applicable to the case of access point 11. That is, at the time point SIFS-after completion of transmitting data frame 32 (at the time point (maximum transmission time length "Tmax"+"SIFS")-after start time point "$t_s$" of transmitting downlink data frame 32), access point 11 stands by for receiving ACK frame 35 from terminal 1. Access point 11 receives ACK frame 35 transmitted from terminal 1. Without reception of ACK frame for the certain time period (="α") from this time point, access point 11 determines the retransmission time-out.

As described above, according to this embodiment, terminal 1 grasps the timing of receiving ACK frame in response to uplink data frame 33 and the time-out time period, on the basis of maximum transmission time length "Tmax" notified by access point 11 to terminal 1 through Trigger frame 31. Accordingly, even in a case where the uplink data frame is shorter than the downlink data frame, retransmission time-out in terminal 1 can be prevented. Furthermore, ACK start timings can be aligned with each other.

In the example in FIG. 6, maximum transmission time length "Tmax" is notified in order to control the timing of transmitting ACK frame. However, instead of maximum transmission time length "Tmax", other control information may be notified as long as the information plays the same role. For example, information that specifies the time point of transmitting ACK frame or information that specifies the time-out time point of ACK frame may be notified.

(ACK Frame Length)

Next, the length of ACK frame is described. The length of ACK frame transmitted by the wireless communication device depends on the MCS (Modulation and Coding Scheme) used for ACK response by the wireless communication device. The ACK frame to be transmitted is of a different ACK frame type according to the content of the corresponding transmission data frame. For example, in a case where the corresponding transmission data frame is an A-MPDU in which data items containing multiple TIDs (Traffic IDs) are aggregated, the ACK frame to be transmitted is Multi-TID Block ACK frame whose size increases with the number of contained TIDs. The ACK frame size is different according to ACK frame type. The ACK frame length depends on the ACK frame type. Furthermore, this length also depends on the content of the transmission data frame for response. Accordingly, there is a possibility that the timing of completing reception of ACK frame deviates even if the start timing of transmitting ACK frame is synchronized.

To align the lengths of ACK frames, access point 11 notifies information that designates the time length of ACK frame (information on the time length of ACK frame) in addition to the maximum transmission time length described above, as an example of the control information, through Trigger frame 31.

Access point 11 sets the information on the time length of ACK frame so that ACK frame that terminal 1 transmits can have the same length as ACK frame that the own station transmits does. The information on the time length of ACK frame may have, for example, a time length value or another value, such as the number of OFDM symbols. Another unit may be used as long as the unit can uniquely specify the length of time period of transmitting ACK frame. Terminal 1 can cause the time point when terminal 1 completes reception of ACK frame 34 from access point 11 to coincide (be synchronized) with the time point when access point 11 completes reception of ACK frame 35 from terminal 1, by generating and transmitting ACK frame 35 according to the information on the time length of ACK frame. When the time points of completion of receiving ACK frames at access point 11 and terminal 1 align with each other, the next frame is transmitted immediately after lapse of SIFS from completion of receiving ACK frame at both access point 11 and terminal 1, thereby allowing full duplex communication to be continuously performed.

In principle, terminal 1 transmits ACK frame that has the length designated by the information on the time length of ACK frame. Note that in a case where the length of ACK frame to be generated is shorter than the length designated by the time length information, padding may be performed so that the length of the entire frame can coincide with the value designated by the time length information. Instead of padding, new frames or data items may be aggregated in ACK frame 35 so that the length of the entire frame coincides with the value designated by the time length information, and may generate an aggregation frame that includes ACK frame. These methods are only examples. Another method may be used as long as the frame to be transmitted contains ACK response, and the length of the frame equals to the designated value of the time length information.

Access point 11 may notify the type and MCS of ACK frame that the own station uses for ACK response, through Trigger frame 31. Terminal 1 generates ACK frame according to the notified type and MCS of the frame. Accordingly, the length of ACK frame is aligned with that for access point 11. Instead of the type of ACK frame, the size of ACK frame may be notified. Examples of the types of ACK frame include a Normal ACK frame, Block ACK frame, Compressed Block ACK frame, Multi-TID Block ACK frame, and Multi-Station Block ACK frame.

If the lengths of ACK frames coincide with each other, access point 11 may notify the combination of the type and MCS of ACK frame that is different from that of the type and MCS of ACK frame used by the own station, to terminal 1, through Trigger frame 31. For example, ACK frame of the type designated for terminal 1 has a larger length than ACK frame to be transmitted by access point 11 does. In this case, the transmission rate of MCS designated for terminal 1 is set higher than the transmission rate of MCS applied to ACK frame to be transmitted by access point 11, thereby allowing the lengths of ACK frames to be equal to each other.

The length of ACK frame 35 transmitted by terminal 1 depends on the details (the type or format of the frame) of corresponding downlink data frame 32. Accordingly, access point 11 can sometimes control the length of ACK frame 35 transmitted by terminal 1 even without preliminary, explicit designation of the type or size of ACK frame through Trigger frame 31. Likewise, the length of ACK frame 34 transmitted by access point 11 depends on the details of corresponding uplink data frame 33.

For example, when a frame having an A-MPDU format in which multiple subframes are aggregated into a single frame is transmitted from a certain wireless communication device, Block ACK frame that contains a bit map representing success or failure in receiving each subframe is transmitted through the acknowledgement response (ACK) by the opposite wireless communication device. In a case where Normal ACK frame is intended to be received as ACK response, a frame is required to be transmitted without aggregating the subframes.

In a case where Multi-TID Block ACK frame is intended to be received as ACK response, the frame having an A-MPDU format in which multiple subframes are aggregated is used to adjust the number of traffic IDs (TIDs) contained in the A-MPDU. The larger the number of traffic IDs (TIDs) contained in A-MPDU, the larger Multi-TID Block ACK frame in ACK response becomes.

In a case where the length of ACK frame returned in ACK response depends on the format of the frame used for transmission, access point 11 can control the type and length of ACK frame 35 transmitted from terminal 1 by selecting the frame format transmitted from downlink data frame 32. Access point may notify, to terminal 1, the frame format used for transmitting downlink data frame 32 using Trigger frame 31 before transmitting downlink data frame 32.

Likewise, ACK frame 34 transmitted by access point 11 depends on the format of the uplink data frame transmitted from terminal 1. Access point 11 may designate the format of the uplink data frame through Trigger frame 31. In this case, terminal 1 generates and transmits uplink data frame 33 using the format designated by access point 11. Access point 11 selects the format of the downlink data frame so that the length of ACK frame can coincide, and generates and transmits downlink data frame 32 using the selected frame format.

Examples of the frame formats that can be preliminarily designated through Trigger frame 31 include the following examples. For example, in a case where a subsequent response with Normal ACK frame is expected, access point 11 can notify that access point 11 intends to transmit Normal ACK frame, by prohibiting uplink data frame 33 from being transmitted in a format in which multiple subframes are aggregated, through Trigger frame 31. Access point 11 may preliminarily designate the number of TIDs contained in uplink data frame 33, through Trigger frame 31. Accordingly, access point 11 can receive Multi-TID Block ACK frame having a desired size.

As described above, access point 11 can align the length of ACK frame for response with that of ACK frame transmitted from the own station, by designating the time length of ACK frame through Trigger frame 31, or by determining the details (the frame type, frame format, etc.) of downlink data frame 32. Accordingly, these ACK frames can be configured to have the same length, thereby allowing the time points of completion of receiving ACK frames at access point 11 and terminal 1 to be the same.

Figure 7:
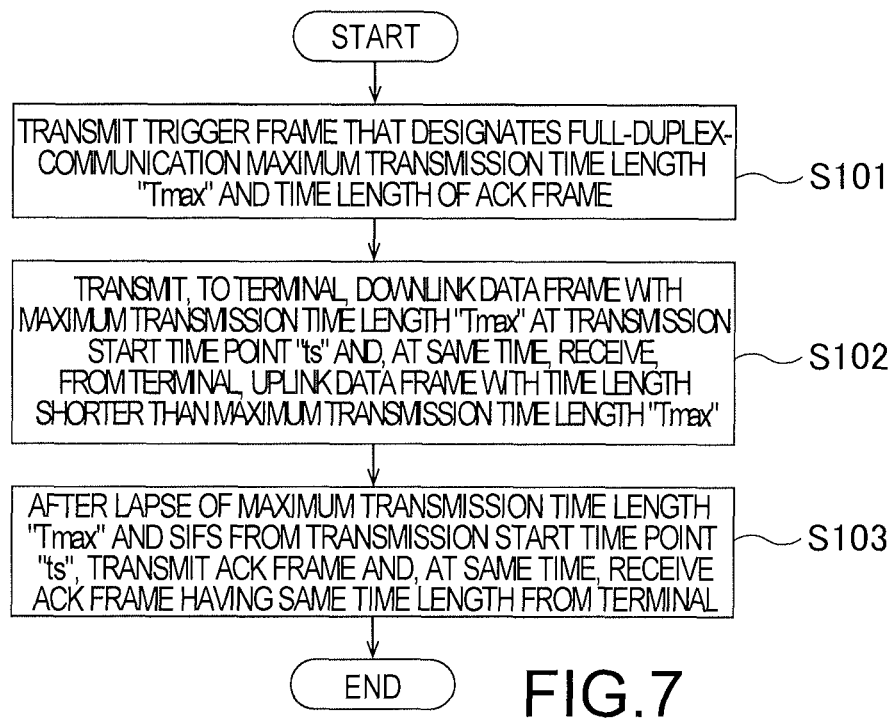
FIG. 7 is a flowchart of an operation at the access point according to the first embodiment.

FIG. 7 is a flowchart of an operation at access point 11 according to this embodiment.

Access point 11 transmits Trigger frame 31 that designates full-duplex-communication maximum transmission time length "Tmax" and the time length of ACK frame, on the basis of the access right to the wireless medium obtained according to the carrier sensing and backoff (S101).

Access point 11 transmits downlink data frame 32 in a predetermined frequency band (e.g., a predetermined channel) at transmission start time point "$t_s$" SIFS-after completion of transmitting Trigger frame 31 (S102). The time length of downlink data frame 32 is maximum transmission time length "Tmax" or a time length shorter than "Tmax". At the same time, access point 11 receives uplink data frame 33 from terminal 1 in the same frequency band (the same channel) (the same S102). Uplink data frame 33 has maximum transmission time length "Tmax" or a time length shorter than "Tmax".

After lapse of maximum transmission time length "Tmax" and SIFS from transmission start time point "$t_s$" of downlink data frame 32, access point 11 transmits ACK frame 34 that is a response frame to uplink data frame 33 (S103). At the same time, access point 11 receives, from terminal 1, ACK frame 35 that is a response frame to downlink data frame 32 (the same S103). The time lengths of ACK frames 34 and 35 are time lengths designated through Trigger frame 31. Accordingly, the transmission start time points of ACK frames 34 and 35 coincide with each other, and the transmission completion time points of ACK frames 34 and 35 also coincide with each other.

Figure 8:
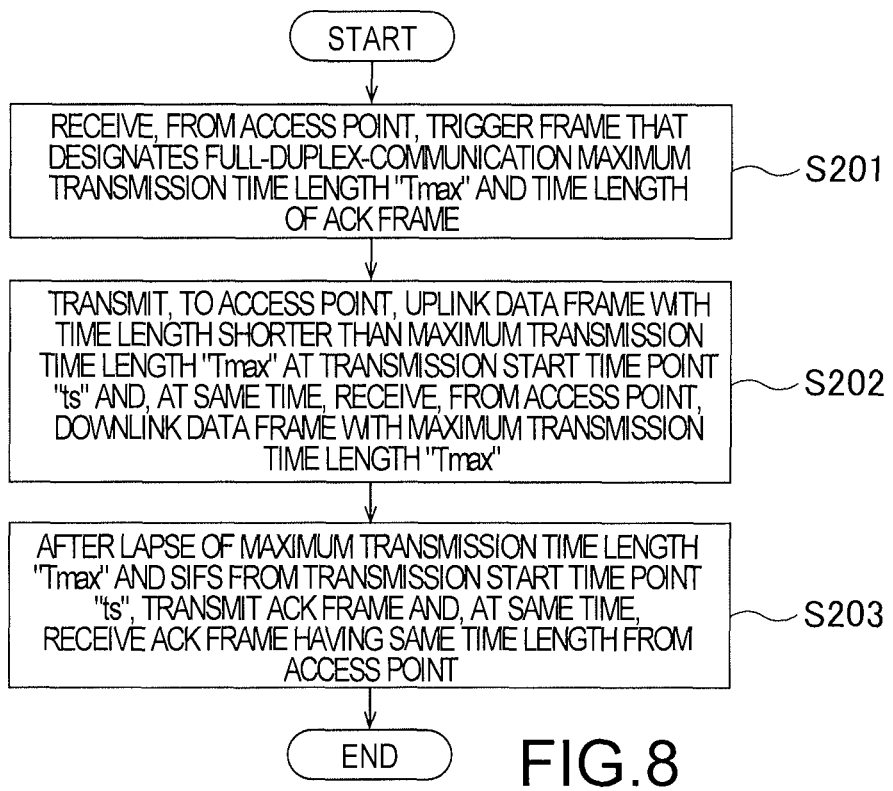
FIG. 8 is a flowchart showing an operation of the terminal according to the first embodiment.

FIG. 8 is a flowchart of an operation of terminal 1 according to this embodiment.

Terminal 1 receives, from access point 11, Trigger frame 31 that designates full-duplex-communication maximum transmission time length "Tmax" and the time length of ACK frame (S201).

Terminal 1 transmits uplink data frame 33 in the predetermined frequency band (e.g., the predetermined channel) at transmission start time point "$t_s$" SIFS-after completion of receiving Trigger frame 31 (S202). Uplink data frame 33 has maximum transmission time length "Tmax" or a time length shorter than "Tmax". At the same time, terminal 1 receives downlink data frame 32 from access point 11 in the same frequency band (the same channel) (the same S202). Downlink data frame 32 has maximum transmission time length "Tmax" or a time length shorter than "Tmax".

After lapse of maximum transmission time length "Tmax" and SIFS from transmission start time point "$t_s$" of uplink data frame 33, terminal 1 transmits ACK frame 35 that is a response frame to downlink data frame 32 (S203). At the same time, terminal 1 receives, from access point 11, ACK frame 34 that is a response frame to uplink data frame 33 (the same S203). The time lengths of ACK frames 34 and 35 are time lengths designated through Trigger frame 31. Accordingly, the transmission start time points of ACK frames 34 and 35 coincide with each other, and the transmission completion time points of ACK frames 34 and 35 also coincide with each other.

Modification Example

In first embodiment, the example of aligning the time length of ACK frames respectively transmitted by the opposite wireless communication devices with each other has been described. In a modification example according to the first embodiment, access point 11 notifies, to terminal 1, information that specifies the time length of ACK frame that is longer than that of ACK frame 34 scheduled to be generated by the own station, through Trigger frame 31.

After receipt of uplink data frame 33, access point 11 adds padding to ACK frame 34 for terminal 1 to make the frame have the time length notified to terminal 1. Instead of padding, data or another frame may be aggregated into ACK frame 34 to generate an aggregation frame having the time length notified to terminal 1. Accordingly, the transmission completion timing of the frame that contains ACK response transmitted from access point 11 can be aligned with the transmission completion timing of ACK frame 35 transmitted from terminal 1.

The method according to this modification example is applicable to a case where ACK frame to be transmitted by terminal 1 is expected to be longer than ACK frame to be transmitted by access point 11. For example, there is a case where access point 11 is notified that terminal 1 is to transmit a frame in which subframes are aggregated, or A-MPDU to be transmitted by terminal 1 contains data on multiple TIDs. In such a case, application of this modification example can align the transmission completion timings of acknowledgement responses with each other.

Second Embodiment

According to the first embodiment, access point 11 notifies the control information to the opposite wireless communication device (terminal 1) through the trigger frame. If the control information can be notified to the opposite wireless communication device in full duplex communication, a frame other than the trigger frame may be used. Hereinafter, an embodiment is described where the control information is notified using a frame other than the trigger frame. Except the point that the type of the frame for notifying the control information is different, the function and configuration of the wireless communication system according to a second embodiment are analogous to those of the first embodiment.

Figure 9:
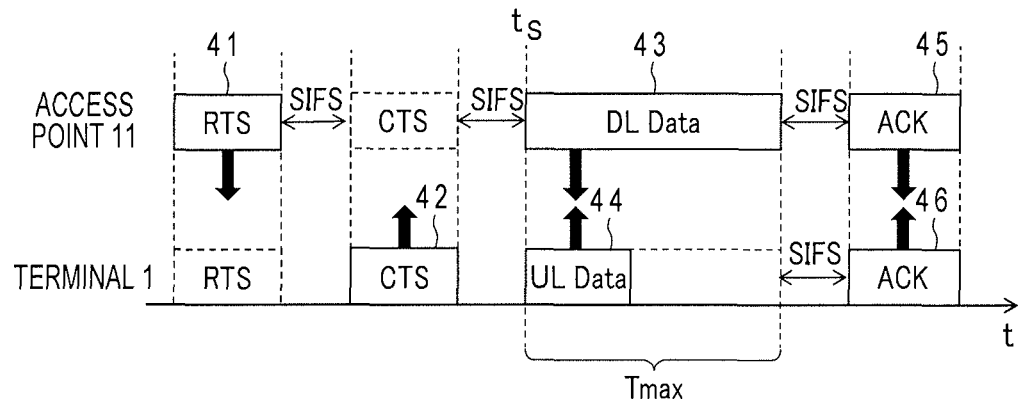
FIG. 9 is a diagram showing an example of a frame sequence according to a second embodiment.

FIG. 9 is a diagram showing an example of a frame sequence according to the second embodiment. In the first embodiment, transmission of the trigger frame by access point 11 serves as the trigger of starting full duplex communication. In the example in FIG. 9, exchange between RTS (Request to Send) frame and a CTS (Clear to Send) frame starts full duplex communication. Here, RTS frame and CTS frame may be frames obtained by extending frames having the same names in the specifications of the wireless LAN standard, or frames newly defined for full duplex communication. The names of the frames may be those different from RTS frame and CTS frame.

Access point 11 notifies maximum transmission time length "Tmax" of uplink data frame 44 to terminal 1 using RTS frame 41. Herein-notified maximum transmission time length "Tmax" is equal to the transmission time length of downlink data frame 43 transmitted to terminal 1. Access point 11 receives, from terminal 1, CTS frame 42 as a response to RTS frame 41. After lapse of SIFS duration from completion of receiving CTS frame 42, transmission of downlink data frame 43 is started. After lapse of SIFS duration from completion of transmitting CTS frame 42, terminal 1 starts transmission of uplink data frame 44. Accordingly, access point 11 and terminal 1 both start transmission at the same time (time point "$t_s$") at the same time point. When terminal 1 completes reception of downlink data frame 43 and access point 11 completes reception of uplink data frame 44, access point 11 and terminal 1 transmit ACK frames 45 and 46 at the same time point (time point "$t_s$"+"Tmax"+"SIFS"). Consequently, the start timings of transmitting ACK frames are synchronized with each other.

As with the first embodiment, also in this embodiment, the time lengths of ACK frames 45 and 46 can be configured to be the same, and the timings of completing reception of ACK frames can be synchronized with each other. That is, access point 11 can designate the time length of ACK frame 46, the MCS of ACK frame 46, the type of ACK frame 46 or the like using RTS frame 41. Access point 11 may add padding to ACK frame 45 to be transmitted by the own station or aggregate other data therein and then transmit the frame to generate a frame (a frame containing ACK response) having the length equal to ACK frame 46 to be transmitted from terminal 1, and may transmit the generated frame.

Third Embodiment

As with the second embodiment, also in a third embodiment, full duplex communication is started by exchanging RTS frame and CTS frame. Note that in this embodiment, terminal 1 transmits RTS frame, access point 11 transmits CTS frame as a response to RTS frame, and thus notifies control information through this CTS frame. Except this difference, the configuration and function of a wireless communication system according to the third embodiment are analogous to those of the first embodiment.

Figure 10:
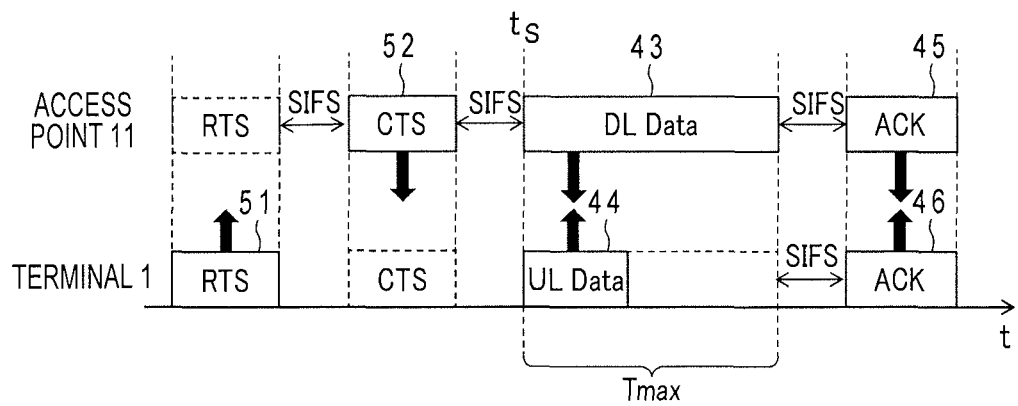
FIG. 10 is a diagram showing an example of a frame sequence according to a third embodiment.

FIG. 10 is a diagram showing an example of a frame sequence according to the third embodiment. In an example of FIG. 10, first, terminal 1 transmits RTS frame 51 to access point 11. Accordingly, in this embodiment, terminal 1 serves as an initiator of full duplex communication. After lapse of SIFS duration, access point 11 having received RTS frame 51 transmits CTS frame 52 to terminal 1.

Access point 11 transmits control information, such as information for specifying maximum transmission time length "Tmax" and the time length of ACK frame, using CTS frame 52. Processes executed thereafter are as those described in the illustration pertaining to the aforementioned embodiments. Adoption of this embodiment can also cause the start timing of transmitting ACK frame and the reception completing timing (ACK timings) to be synchronized with each other. As long as ACK timings are synchronized, various modifications described in the first embodiment may be applied to the processes in this embodiment.

Fourth Embodiment

In the embodiments described above, access point 11 notifies all the pieces of control information in a manner aggregated in the single frame to terminal 1. Alternatively, the pieces of control information may be divided into multiple frames and notified. In a fourth embodiment, the control information is divided into multiple frames and notified. Except processes described below, the configuration and function of a wireless communication system according to the fourth embodiment are analogous to those of the first embodiment.

Figure 11:
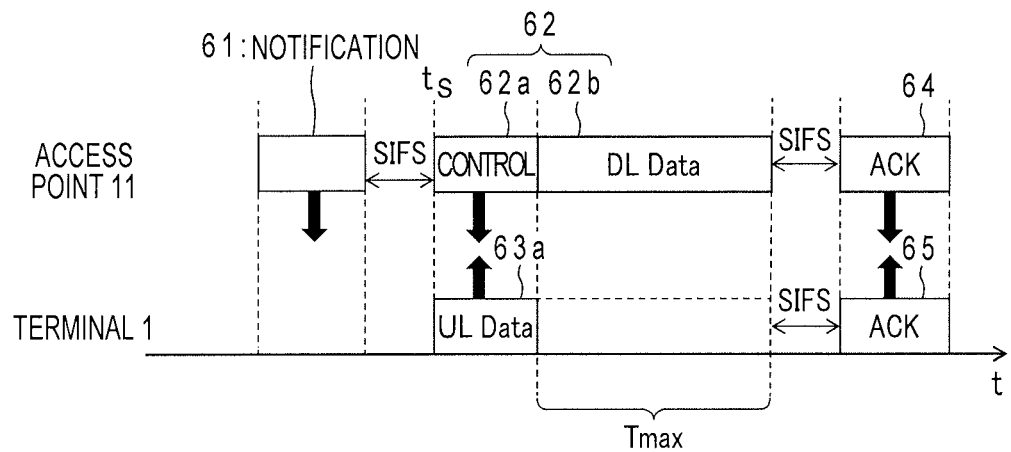
FIG. 11 is a diagram showing an example of a frame sequence according to a fourth embodiment.

FIG. 11 shows an example of a frame sequence according to the fourth embodiment. Hereinafter, referring to FIG. 11, the processes are described. First, access point 11 notifies maximum transmission time length "Tmax" of uplink data frame 63 to terminal 1 using notification frame 61. Notification frame 61 may be, for example, a trigger frame, RTS frame, or CTS frame. This frame may be a beacon frame periodically transmitted by access point 11. The type of frame pertaining to notification frame 61 is not necessarily specified. Hereinafter, a case where notification frame 61 is the trigger frame or CTS frame is assumed.

As with the example in FIG. 11, after lapse of SIFS from completion of receiving notification frame 61, terminal 1 starts transmission of uplink data frame 63. Transmission start time point "$t_s$" of uplink data frame 63 may be designated in notification frame 61, and transmission of uplink data frame 63 may be started at the designated time point.

In this embodiment, the frame downlink-transmitted from access point 11 is aggregation frame 62 (hereinafter frame 62) in which control frame 62a and downlink data frame 62b are aggregated as subframes. The format of frame 62 may be, for example, A-MPDU or A-MSDU. Another format may be adopted instead.

In FIG. 11, the frame aggregation is made in an order of control frame 62a and downlink data frame 62b. Alternatively, the order of control frame 62a and downlink data frame 62b may be inverted.

Control frame 62a designates the time length of ACK frame 65, which is to be transmitted after receipt of frame 62 by terminal 1. The time length of ACK frame may be directly designated. Alternatively, the time length may be controlled by designating the MCS and the type of ACK frame. Alternatively, the time length may be designated by another method. The details are analogous to those described in the above embodiments. The type and format of the frame used to control frame 62a are not necessarily specified.

In the example in FIG. 11, at time point "$t_s$"+maximum transmission time length "Tmax"+"SIFS", access point 11 and terminal 1 simultaneously transmit ACK frames 64 and 65. If the transmission timings of ACK frames 64 and 65 are synchronized with each other, the transmission time points of ACK frames 64 and 65 may be time points later than time point "$t_s$"+maximum transmission time length "Tmax"+ "SIFS". For example, control frame 62a designates not only the length of ACK frame 65 but also the transmission time point of ACK frame 65. The time point may be designated by any of the methods with a relative lapse of time from a certain time point, or with an absolute time point. Accordingly, the transmission start time points of ACK frames 64 and 65 can be adjusted to freely selected time points later than time point "$t_s$"+"Tmax"+"SIFS" while preventing access point 11 and terminal 1 from causing retransmission time-out.

As described in this embodiment, notification frame 61 designates maximum transmission time length "Tmax", and control frame 62a designates the time length of ACK frame, that is, maximum transmission time length "Tmax" and the time length of ACK frame are designated by different timings (frames), thereby allowing the deviation of ACK timings to be canceled while achieving full duplex communication. The designation of the transmission start time point of uplink data frame 63, and the designation of the transmission start time point of ACK may also be made. Consequently, use of the scheme of this embodiment has an advantage that can flexibly control the sequence pertaining to frame transmission and reception.

Modification Example

In a modification example of the fourth embodiment, the transmission timing of the uplink data frame is different. The configuration and function of a wireless communication system according to this modification example are analogous to those in the first embodiment except the difference in view of processes. The processes are hereinafter described mainly on the difference from the fourth embodiment.

Figure 12:
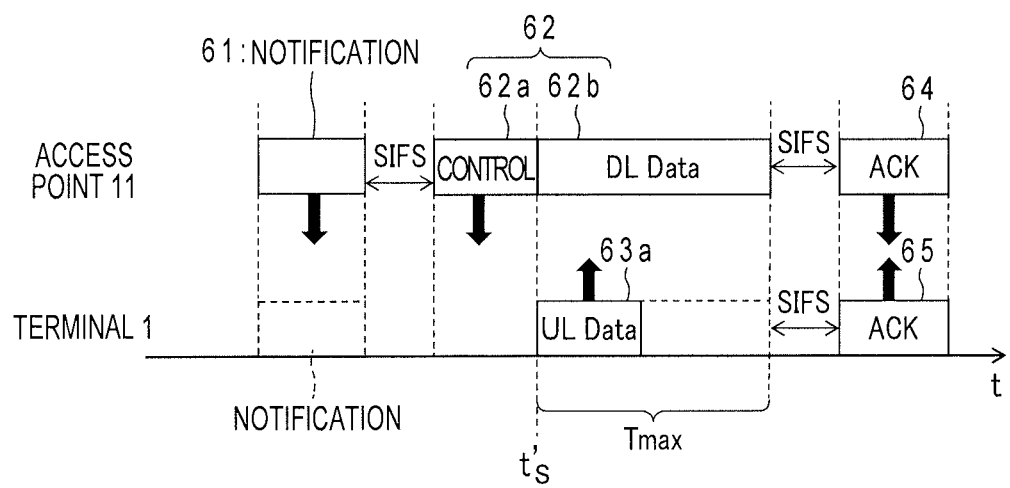
FIG. 12 is a diagram showing an example of a frame sequence according to a modification example of the fourth embodiment.

FIG. 12 shows an example of a frame sequence according to the modification example according to the fourth embodiment. The timing at which terminal 1 transmits uplink data frame 63a is different from that in the example in FIG. 11. Terminal 1 starts to transmit uplink data frame 63a at time point "$t'_s$" after completion of receiving control frame 62a included in frame 62.

The transmission start time point "$t'_s$" of uplink data frame 63a is designated by notification frame 61 or control frame 62a. In a case where access point 11 sets the time point at which transmission of downlink data frame 62b is started to time point "$t'_s$", the transmission start time points of uplink data frame 63a and downlink data frame 62b can be synchronized with each other. In this case, setting of maximum transmission time length "Tmax" of terminal 1 to be equal to the transmission time period of downlink data frame 62b facilitates synchronization of the transmission start time points of ACK frames.

Fifth Embodiment

In this embodiment, control information is notified using the MAC header of a downlink data frame.

Figure 13:
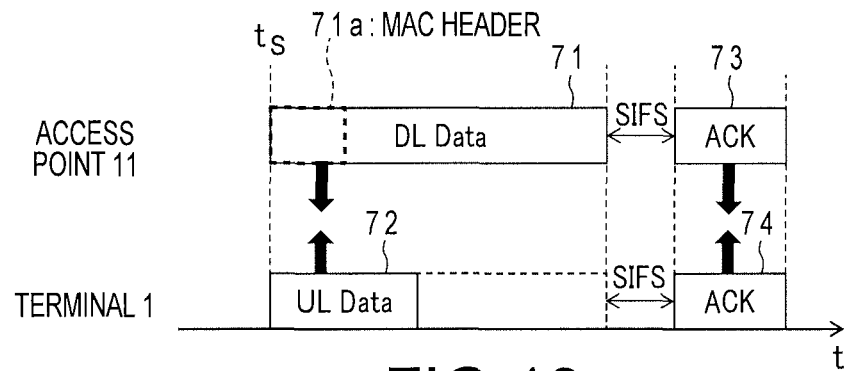
FIG. 13 is a diagram showing an example of a frame sequence according to a fifth embodiment.

FIG. 13 is a diagram showing an example of a frame sequence according to a fifth embodiment.

In FIG. 13, transmission of downlink data frame 71 by access point 11, and transmission of uplink data frame 72 by terminal 1 are simultaneously performed. MAC header 71a of downlink data frame 71 designates the time length of ACK frame 74. For example, information that designates the time length is set in "Control" field of MAC header 71a. The time length of ACK frame may be designated, for example, by any of the methods of directly designating the value of the time length, of designating the type of ACK frame, and of designating the MCS. The designation may be performed by another method. It is assumed that the start timing of full duplex communication is predetermined by any method.

In the example of FIG. 13, the time length of ACK frame is designated using the MAC header. Control information other than that on the time length of ACK frame may be notified using the MAC header. For example, the transmission start timing of ACK frame and the like may be notified. Alternatively, the time length of the uplink data frame, or the start timing of transmitting the uplink data frame may be notified. In this case, after receipt of MAC header 71a, terminal 1 transmits the uplink data frame.

This embodiment may combine each of the embodiments described above. For example, the control information can be notified through the MAC header of the downlink data frame and another frame (the trigger frame, CTS frame, RTS frame or the like) in a separated manner.

Sixth Embodiment

Figure 14:
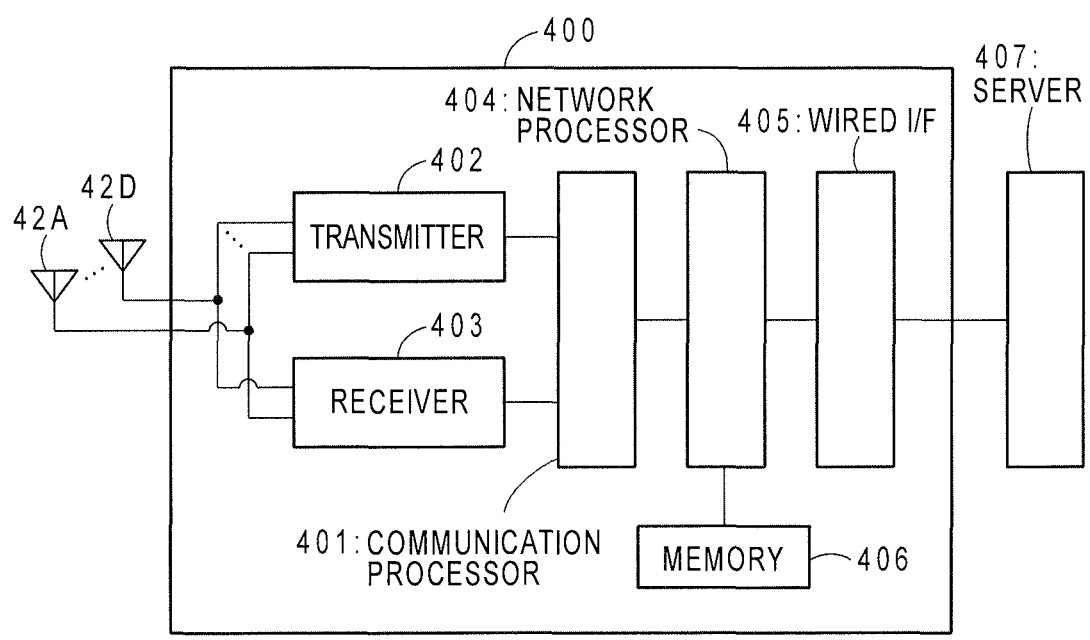
FIG. 14 is a functional block diagram of the access point or the terminal.

FIG. 14 is a functional block diagram of a base station (access point) 400 according to the second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller or the controlling circuitry in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The communication processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to eighth embodiments may be cached in the memory 406. The frame transmitted by the base station in the first to eighth embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 14. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Seventh Embodiment

Figure 15:
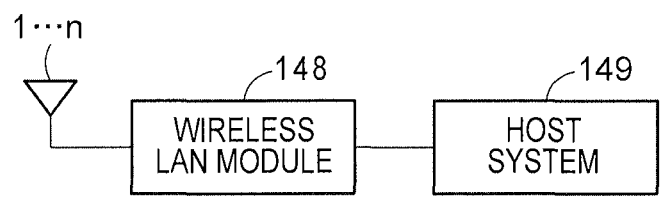
FIG. 15 is a diagram showing an example of an overall configuration of the terminal or the access point.

FIG. 15 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 16:
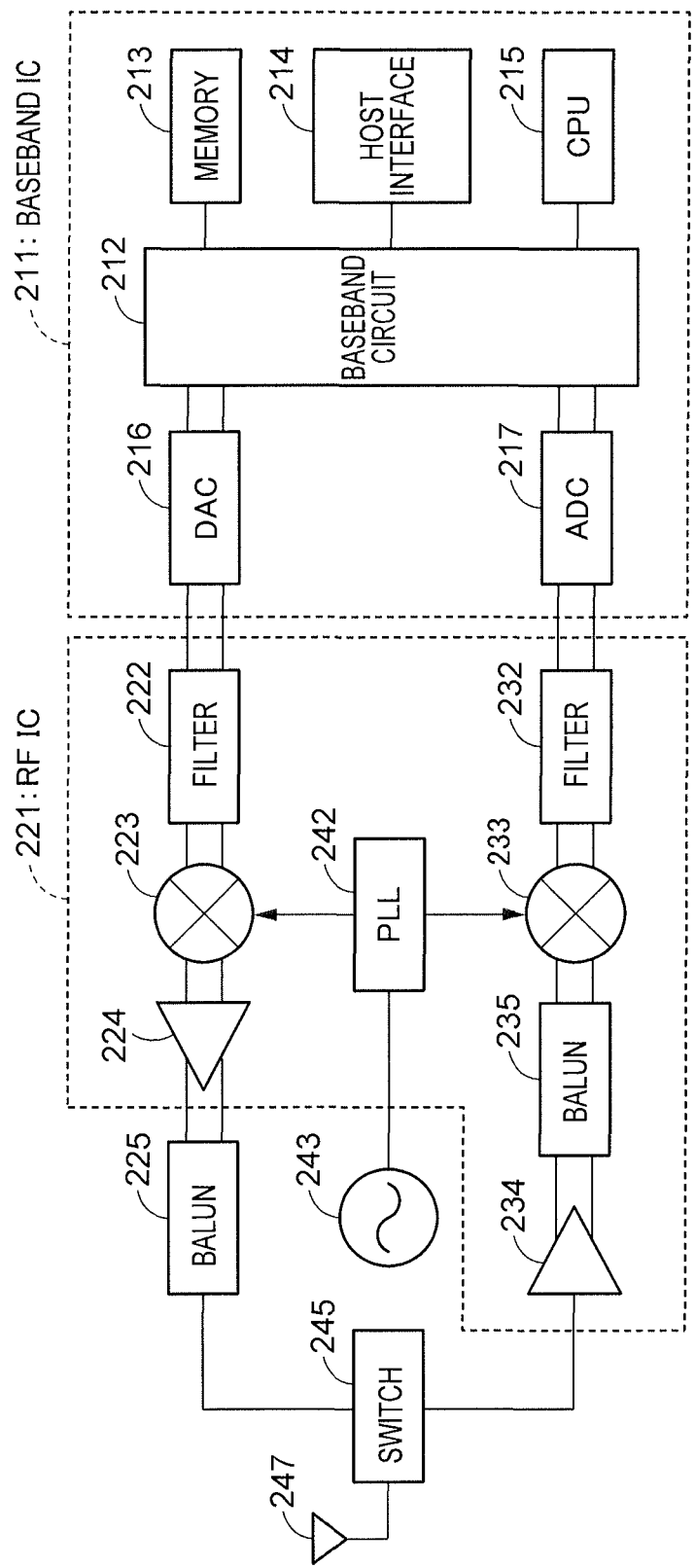
FIG. 16 is a diagram showing a hardware configuration example of a wireless communication device mounted on the terminal or the access point.

FIG. 16 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples of the wireless communication device as described in the above-stated any embodiment. In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program required for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Processing of the self-interference canceller 25 and the controller 26 in FIG. 9 is carried out in the baseband circuit 212 as one example. A circuit performing functions of the self-interference canceller 25 may be arranged in the RF IC 221 side.

Eighth Embodiment

Figure 17:
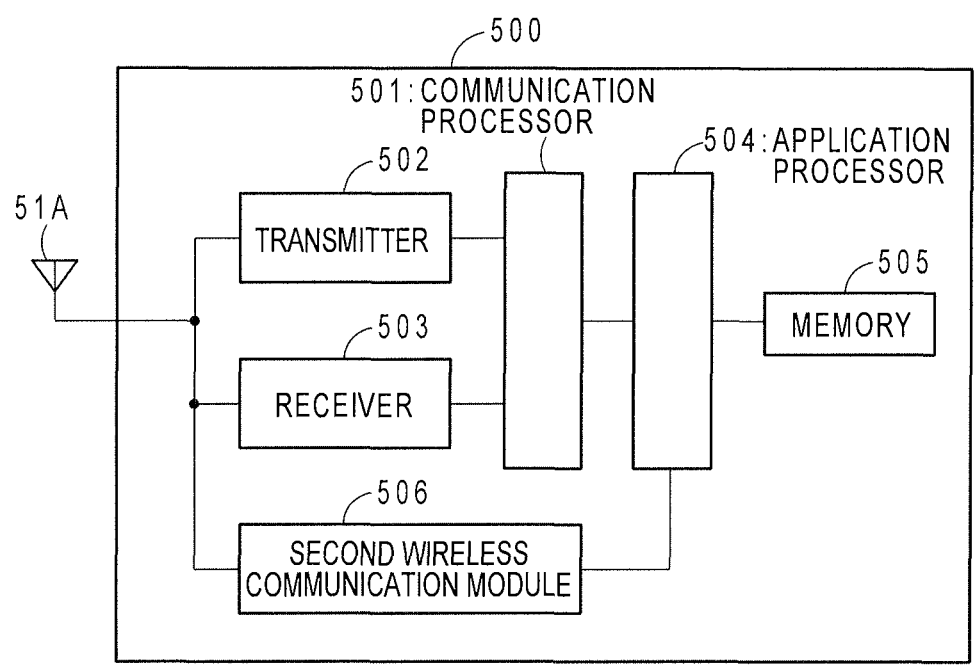
FIG. 17 is a functional block diagram of the terminal or the access point.

FIG. 17 is a functional block diagram of the terminal (STA) 500 according to the present embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to the controller as described in the first embodiment. The transmitter 502 and the receiver 503 have the functions similar to the transmitter and the receiver as described in the first embodiment. The transmitter 502 and the receiver 503 may perform analog domain processing in the transmitter and the receiver as described in the first embodiment and the communication processor 501 may perform digital domain processing in the transmitter and the receiver as described in the first embodiment. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 has the similar configuration to the WLAN module as shown in FIG. 15 or FIG. 16 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Ninth Embodiment

Figure 18A:
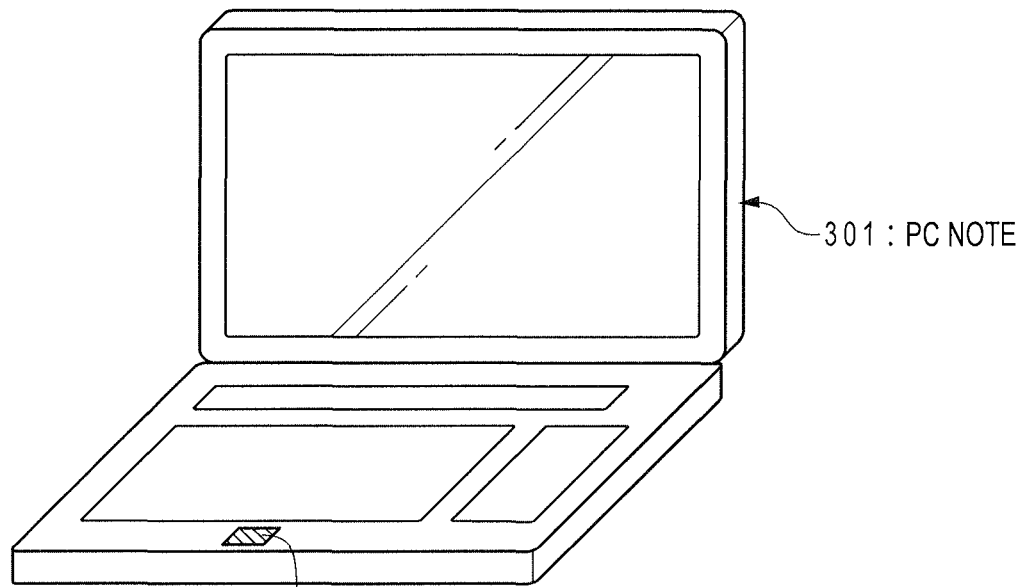
FIGS. 18A and 18B each is a perspective view of the terminal according to an embodiment of the present invention.
Figure 18B:
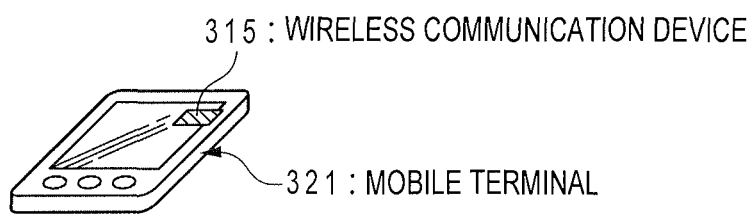

FIG. 18A and FIG. 18B are perspective views of wireless terminal according to the present embodiment. The wireless terminal in FIG. 18A is a notebook PC 301 and the wireless communication device (or a wireless device) in FIG. 18B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, vehicle and so on.

Figure 19:
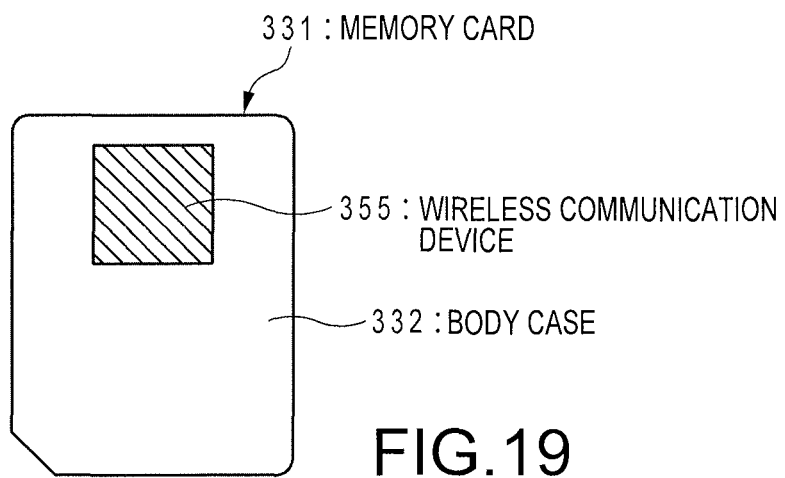
FIG. 19 is a diagram showing a memory card according to an embodiment of the present invention.

Moreover, a wireless communication device installed in a terminal (which may indicate a base station) can also be provided in a memory card. FIG. 19 illustrates an example of a wireless communication device mounted on a memory card. A memory card 331 contains a wireless communication device 355 and a body case 332. The memory card 331 uses the wireless communication device 355 for wireless communication with external devices (the terminal, the access point or both of them etc.). Here, in FIG. 19, the description of other installed elements (for example, a memory, and so on) in the memory card 331 is omitted.

Tenth Embodiment

In the present embodiment, a bus, a processor unit and an external interface unit are provided in addition to the configuration of the wireless communication device (which may indicate the wireless communication device mounted in the terminal, the wireless communication device mounted in the access point or both of them) according to any of the embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the base station or the wireless terminal according to the present embodiment. Alternatively, the processing unit may be included in the integrated circuit of the wireless communication device installed in the base station, or in the integrated circuit of the wireless communication device installed in the wireless terminal.

Eleventh Embodiment

In the present embodiment, a clock generating unit is provided in addition to the configuration of the wireless communication device (which may indicate the wireless communication device mounted in the terminal, the wireless communication device mounted in the access point or both of them) according to any of the embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Twelfth Embodiment

In the present embodiment, a power source unit, a power source controlling unit and a wireless power feeding unit are included in addition to the configuration of the wireless communication device (which may indicate the wireless communication device mounted in the terminal, the wireless communication device mounted in the access point or both of them) according to any of embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Thirteenth Embodiment

In the present embodiment, a SIM card is added to the configuration of the wireless communication device according to any of the embodiments. For example, the SIM card is connected with the transmitter, the receiver, the controller or a plurality of them in the wireless communication device. Thus, by adopting a configuration in which the SIM card is included in the wireless communication device, authentication processing can be easily performed.

Fourteenth Embodiment

In the present embodiment, a video image compressing/decompressing unit is added to the configuration of the wireless communication device according to any of the embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Fifteenth Embodiment

In the present embodiment, an LED unit is added to the configuration of the wireless communication device (which may indicate the wireless communication device mounted in the terminal, the wireless communication device mounted in the access point or both of them) according to any of the embodiments. For example, the LED unit is connected to the transmitter, the receiver, the controller or a plurality of them in the wireless communication device. Thus, by adopting a configuration in which the LED unit is included in the wireless communication device, notifying the operation state of the wireless communication device to the user can be easily done.

Sixteenth Embodiment

In the present embodiment, a vibrator unit is included in addition to the configuration of the wireless communication device (which may indicate the wireless communication device mounted in the terminal, the wireless communication device mounted in the access point or both of them) according to any of the embodiments. For example, the vibrator unit is connected to the transmitter, the receiver, the controller or a plurality of them in the wireless communication device. Thus, by adopting a configuration in which the vibrator unit is included in the wireless communication device, notifying the operation state of the wireless communication device to the user can be easily done.

Seventeenth Embodiment

In the present embodiment, the configuration of the wireless communication device includes a display in addition to the configuration of the wireless communication device (which may indicate the wireless communication device mounted in the terminal, the wireless communication device mounted in the access point or both of them) according to any one of the above embodiments. The display may be connected to the controller. As seen from the above, the configuration including the display to display the operation state of the wireless communication device on the display allows the operation status of the wireless communication device to be easily notified to a user.

Eighteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 20:
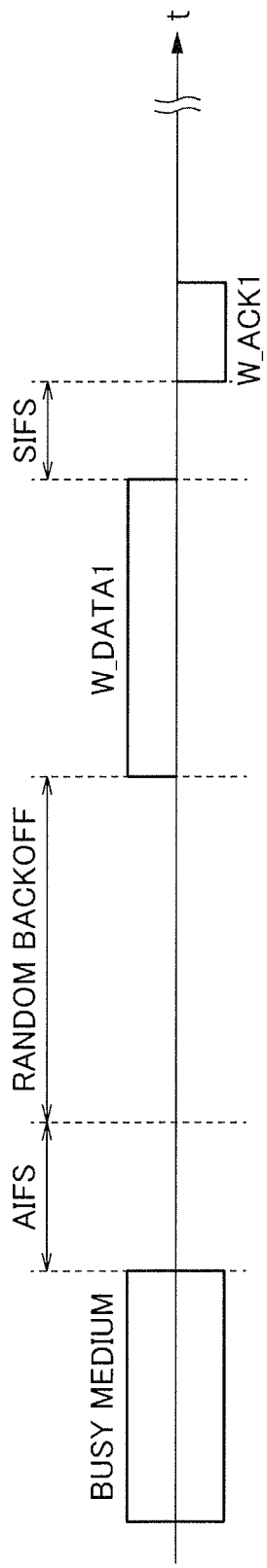
FIG. 20 is a diagram showing an example of frame exchange in a contention duration.

Here, FIG. 20 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device, comprising:
a receiver configured to receive a first frame in a first frequency band during a first period; and
a transmitter configured to transmit a second frame in a second frequency band during a second period, wherein the first frequency band and the second frequency band are at least partially overlapped, and the first period and the second period are at least partially overlapped;
wherein the transmitter is configured to transmit control information for a transmission timing of a third frame, wherein the third frame is a response frame to the second frame, and
the transmitter is configured to transmit a fourth frame at a timing based on the control information, wherein the fourth frame is a response frame to the first frame.

2. The wireless communication device according to claim 1,
wherein the receiver is configured to receive the third frame, and
a transmission completion time point of the fourth frame coincides with a reception completion time point of the third frame.

3. The wireless communication device according to claim 2,
wherein the control information contains information for specifying a transmission start time point of the third frame.

4. The wireless communication device according to claim 3,
wherein the transmission start time point of the third frame is a time point after lapse of a predetermined time period from a transmission completion time point of the second frame.

5. The wireless communication device according to claim 2,
wherein the control information contains information that designates a time length of the third frame, and
a time length of the fourth frame is identical to the time length of the third frame.

6. The wireless communication device according to claim 2,
wherein the control information contains information that designates content of the first frame, and
the fourth frame has a time length that depends on the content of the first frame.

7. The wireless communication device according to claim 2,
wherein the control information contains information that specifies a maximum transmission time length of the first frame, and
the first frame and the second frame have a time length equal to or less than the maximum transmission time length.

8. The wireless communication device according to claim 7,
wherein a transmission start time point of the fourth frame and a transmission start time point of the third frame are time points after at least the maximum transmission time length from a transmission start time point of the first frame.

9. The wireless communication device according to claim 1,
wherein the transmitter is configured to transmit the second frame after lapse of a predetermined time period from transmission of the control information.

10. The wireless communication device according to claim 1,
wherein the second frame includes a plurality of subframes, and at least one of the subframes contains the control information.

11. The wireless communication device according to claim 1,
wherein a header of the second frame contains the control information.

12. The wireless communication device according to claim 1,
wherein the third frame contains an acknowledgement response to the second frame, and
the fourth frame contains an acknowledgement response to the first frame.

13. The wireless communication device according to claim 1, further comprising at least one antenna.

14. A wireless communication method, comprising:
receiving a first frame in a first frequency band during a first period;
transmitting a second frame in a second frequency band during a second period, wherein the first frequency band and the second frequency band are at least partially overlapped, and the first period and the second period are at least partially overlapped;
transmitting control information for a transmission timing of a third frame, wherein the third frame is a response frame to the second frame; and
transmitting a fourth frame at a timing based on the control information, wherein the fourth frame is a response frame to the first frame.

15. A wireless communication device, comprising:
a receiver configured to receive a first frame in a first frequency band during a first period; and
a transmitter configured to transmit a second frame in a second frequency band during a second period, wherein the first frequency band and the second frequency band are at least partially overlapped, and the first period and the second period are at least partially overlapped, wherein the receiver is configured to receive control information for a transmission timing of a third frame, wherein the third frame is a response frame to the first frame, and the transmitter is configured to transmit the third frame at the transmission timing based on the control information.

16. The wireless communication device according to claim 15, wherein the receiver is configured to receive a fourth frame that is a response frame to the second frame, and a reception completion time point of the fourth frame coincides with a transmission completion time point of the third frame.

17. The wireless communication device according to claim 16, wherein the control information contains information that designates a transmission start time point of the third frame, the transmitter is configured to transmit the third frame at the transmission start time point, and a reception start time point of the fourth frame at the receiver coincides with a transmission start time point of the third frame.

18. The wireless communication device according to claim 17, wherein the control information contains the information that designates the transmission start time point of the third frame, the transmitter is configured to transmit the third frame at the transmission start time point, and the device further comprising a controller configured to determine retransmission time-out in a case where the fourth frame is not received in a predetermined time period after the transmission start time point of the third frame.

19. The wireless communication device according to claim 16, wherein the control information contains information that designates a time length of the third frame, and a time length of the fourth frame is identical to a time length of the third frame.

20. The wireless communication device according to claim 15, wherein the third frame contains an acknowledgement response to the first frame.

21. The wireless communication device according to claim 15, further comprising at least one antenna.

22. A wireless communication method, comprising:

receiving a first frame in a first frequency band during a first period;

transmitting a second frame in a second frequency band during a second period, wherein the first frequency band and the second frequency band are at least partially overlapped, and the first period and the second period are at least partially overlapped;

receiving control information for a transmission timing of a third frame, wherein the third frame is a response frame to the first frame; and transmitting the third frame at the transmission timing based on the control information.

* * * * *